United States Patent
Okada et al.

(10) Patent No.: US 7,612,665 B2
(45) Date of Patent: Nov. 3, 2009

(54) WIRELESS SENSOR SYSTEM AND BEARING ASSEMBLY HAVING BUILT-IN WIRELESS SENSOR

(75) Inventors: Koichi Okada, Iwata (JP); Masatoshi Mizutani, Iwata (JP); Norihiko Sasaki, Iwata (JP)

(73) Assignee: NTN Corporation, Osaka (JP)

( * ) Notice: Subject to any disclaimer, the term of this patent is extended or adjusted under 35 U.S.C. 154(b) by 444 days.

(21) Appl. No.: 10/572,308

(22) PCT Filed: Sep. 14, 2004

(86) PCT No.: PCT/JP2004/013353

§ 371 (c)(1),
(2), (4) Date: Mar. 17, 2006

(87) PCT Pub. No.: WO2005/029436

PCT Pub. Date: Mar. 31, 2005

(65) Prior Publication Data

US 2007/0030162 A1 Feb. 8, 2007

(30) Foreign Application Priority Data

Sep. 19, 2003 (JP) .............................. 2003-327699
Sep. 19, 2003 (JP) .............................. 2003-327700

(51) Int. Cl.
*G08B 21/00* (2006.01)
(52) U.S. Cl. .................. 340/540; 340/442; 340/444; 340/448; 340/686.1; 73/146.3

(58) Field of Classification Search ................. 340/442, 340/444, 445, 447, 449, 448, 686.1; 73/146.3, 73/514.39, 862.193; 324/174; 455/456.1
See application file for complete search history.

(56) References Cited

U.S. PATENT DOCUMENTS 4,263,579 A 4/1981 Corgan et al.

(Continued)

FOREIGN PATENT DOCUMENTS

CN 1412564 4/2003

(Continued)

OTHER PUBLICATIONS

Otsuki Hisashi et al., Patent Abstracts of Japan, "Bearing Device for Wheel", Publication No. 2002-055113, Publication Date: Feb. 20, 2002.

(Continued)

*Primary Examiner*—Davetta W Goins

(57) ABSTRACT

A wireless sensor system in which the sensor signal is hardly affected by disturbance and therefore has an increased reliability, which can be constructed light-weight and compact in structure inclusive of the electric power system and in which communication is possible at all times, and a wireless sensor incorporated bearing assembly of a light-weight and compact structure utilizing such wireless sensor system. This wireless sensor system includes a wireless sensor unit and a sensor signal receiving unit. The wireless sensor unit includes a sensor section to detect a target of detection, a digitalizing section to digitalize a sensor signal thereof, and a sensor signal transmitting section.

17 Claims, 9 Drawing Sheets

U.S. PATENT DOCUMENTS

| | | | |
|---|---|---|---|
| 4,749,993 | A | 6/1988 | Szabo et al. |
| 4,966,034 | A | 10/1990 | Bock et al. |
| 5,193,387 | A | 3/1993 | Hodate |
| 6,585,420 | B2 | 7/2003 | Okada et al. |
| 6,696,935 | B2 | 2/2004 | Bonardi et al. |
| 6,838,985 | B2 * | 1/2005 | Ghabra et al. ............... 340/445 |
| 6,958,685 | B2 * | 10/2005 | Desai ........................ 340/447 |
| 6,980,084 | B1 | 12/2005 | Yones |
| 7,018,106 | B2 * | 3/2006 | Okada ........................ 384/448 |
| 7,021,132 | B2 | 4/2006 | Nigon et al. |
| 7,034,711 | B2 * | 4/2006 | Sakatani et al. .......... 340/686.1 |
| 7,104,438 | B2 * | 9/2006 | Benedict .................... 235/375 |
| 7,148,793 | B2 * | 12/2006 | Lin ........................... 340/442 |
| 2002/0033638 | A1 | 3/2002 | Okada et al. |
| 2003/0093188 | A1 | 5/2003 | Morita et al. |
| 2003/0110860 | A1 | 6/2003 | Okada |
| 2004/0150516 | A1 | 8/2004 | Faetanini |
| 2005/0046559 | A1 | 3/2005 | Kulha |
| 2005/0068161 | A1 | 3/2005 | Ichinose et al. |
| 2005/0231346 | A1 | 10/2005 | Ichinose et al. |

FOREIGN PATENT DOCUMENTS

| | | |
|---|---|---|
| CN | 1424212 | 6/2003 |
| JP | 64-60118 | 3/1989 |
| JP | 4-65800 | 3/1992 |
| JP | 4-133808 | 5/1992 |
| JP | 08-010232 | 1/1996 |
| JP | 9-5178 | 1/1997 |
| JP | 10-10141 | 1/1998 |
| JP | 10-19710 | 1/1998 |
| JP | 11-238193 | 8/1999 |
| JP | 2001-15090 | 6/2001 |
| JP | 2001-151090 | 6/2001 |
| JP | 2001-349794 | 12/2001 |
| JP | 2002-151090 | 5/2002 |
| JP | 2002-364661 | 12/2002 |
| JP | 2002-544612 | 12/2002 |
| JP | 2003-58976 | 2/2003 |
| JP | 2003-146196 | 5/2003 |
| JP | 2003-151063 | 5/2003 |
| JP | 2003-151064 | 5/2003 |
| JP | 2003-187368 | 7/2003 |
| WO | 00/69663 | 11/2000 |

OTHER PUBLICATIONS

Office Action issued in corresponding Chinese Patent Application No. 2004800269686, mailed on Jan. 25, 2008.

U.S. Appl. No. 10/569,053, filed Feb. 22, 2006, Mizutani et al., NTN Corporation.

U.S. Appl. No. 10/526,903, filed Mar. 7, 2005, Sahashi et al, NTN Corporation.

Office Action mailed Feb. 19, 2009 for co-pending U.S. Appl. No. 10/569,053.

* cited by examiner

WIRELESS SENSOR SYSTEM AND BEARING ASSEMBLY HAVING BUILT-IN WIRELESS SENSOR

This application claims the benefit of PCT International Application Number PCT/JP2004/013353 filed Sep. 14, 2004 and Japanese Application Nos. 2003-327699, filed Sep. 19, 2003 and 2003-327700, filed Sep. 19, 2003 in Japan, the disclosures of which are incorporated herein by reference.

FIELD OF THE INVENTION

The present invention relates to a wireless sensor system for transmitting by wireless various sensor signals such as, for example, detection signals indicative of the number of revolution provided in various machines and equipments and wheel support bearing assemblies mounted in automotive vehicles.

BACKGROUND ART

It has been well known that automobiles and various industrial machines and equipments are provided with a variety of sensors to detect targets of detection such as, for example, the number of revolutions, temperatures and vibrations so that those detected parameters can be used in controlling and state observation of those automobiles and industrial machines and equipments. Outputs from the sensors are generally transmitted through closed circuits and wires, but experienced difficulty often arises in locating places of installation of those closed circuits and wires. Under those circumstances, the wireless sensor system is currently utilized, in which detection signals are transmitted by the utilization of electromagnetic waves. Transmitters used therein are generally provided with a compact battery.

Also, in the ABS (Anti-lock Brake System), in which the number of revolution of a vehicle wheel is detected by a revolution sensor so that the automobile braking can be controlled, the wireless system has been suggested, in which in order to avoid a possible accident which may be brought about by damage to the sensor wiring within a tire housing and also to minimize the cost of assemblage, the use of harnesses extending between the vehicle wheel and the vehicle body structure is eliminated and, instead, as a revolution sensor, the detection signal thereof are transmitted in the form of electromagnetic waves. (See the Japanese Laid-open Patent Publication No. 2001-151090.) In an exemplary revolution sensor system of this kind, a multipolar rotary electric generator is used to accomplish the supply of an electric power for the sensors and an electric power for the transmitters as well as to accomplish the detection of the number of revolutions by means of a self-generation of the electric power, so that it can be assembled compact in size with no need to supply the electric power from the vehicle body structure to the revolution sensors. (See the Japanese Laid-open Patent Publication No. 2002-55113.)

Also, the Japanese Laid-open Patent Publication No. 2003-146196 discloses the use of a self-diagnosing circuit in a revolution sensor incorporated wheel support bearing assembly having a wirelessly transmittable revolution sensor used therein, in which the supply of an electric power to the sensors and a radio wave transmitters is carried out by an electric generator that concurrently serves as the revolution sensor, but also has made mention of the wireless supply of an electric power from an outside power source.

The Japanese Laid-open Patent Publication No. 2003-58976 discloses the transmission of the sensor signals in the form as digitalized. As an electric power source, a battery or an electric generator is used therein.

In the wireless sensor system utilizing the battery as an electric power source as discussed above, the battery is limited to a specific lifetime and, accordingly, replacement of the battery is required when the electric power stored therein is consumed, making it complicated to maintain the lifetime of the battery. It also involves in an environmental problem associated with disposal of the battery.

In the revolution sensor system utilizing the self-generated electric power as discussed above, since generation of the electric power takes place only when and after the vehicle wheel rotates, detection would be instable at an extremely low speed approximating to a halt although it would work stably at a speed of about 10 Km/h falling within the operating range of the ABS. Also, it cannot be applied to detection of a target of detection other than revolution, for example, temperature or the like.

Also, in the wireless electric power supply system, a large electric power is required to be transmitted for electric power supply since the efficiency is low as compared with that through the closed circuit and wires and the generation of the electric power by means of the electric power generator. However, to continuously transmit the large electric power in view of failure of the supply of the electric power brings about a problem that the electric power consumption of the system as a whole tends to increase.

As discussed above, the wireless sensor system requires a stable securement of the electric power.

On the other hand, in the wireless sensor system, the sensor signal to be transmitted by wireless is susceptible to influence brought about by disturbance noises and insufficiency is encountered with in terms of the system reliability. By way of example, in the system disclosed in the Japanese Laid-open Patent Publication No. 2003-146196 referred to above, since the supply of the electric power by wireless is carried out, the electric power can be available at all times, but there is a problem in that the sensor signal is susceptible to influence brought about by the disturbance. Also, where a plurality of wireless sensor units are employed, not only is it necessary to change the frequency of transmission of the sensor signal for each of the wireless sensor units, but also a plurality of signal receiving circuits each for the respective particular sensor signal transmission frequency are required. The electromagnetic waves used for the wireless supply of the electric power can be easily rendered to be non-modulated electromagnetic waves. However, in such case, in order to avoid interference between the electromagnetic waves for the electric power supply and the electromagnetic waves for the transmission of the sensor signals, a different frequency must be used for each of the electromagnetic waves for the electric power supply and the electromagnetic waves for the transmission of the sensor signals, or a different plane of polarization must be used for each of the electromagnetic waves for the electric power supply and the electromagnetic waves for the transmission of the sensor signals.

In the system disclosed in the Japanese Laid-open Patent Publication No. 2003-58976 referred to above, since the sensor signal is digitalized before it is transmitted, the sensor signal is robust against the influence brought about by the disturbance, but it involves problems similar to those discussed above since a battery or an electric power generator is used as the electric power source.

As discussed above, numerous problems are encountered in the wireless sensor system in connection with securement of the electric power source and reliability of the sensor signals.

DISCLOSURE OF THE INVENTION

An object of the present invention is to provide a wireless sensor system, and a wireless sensor incorporated bearing assembly of a light-weight and compact structure utilizing such wireless sensor system, in which the sensor signal is hardly affected by the disturbance noises and therefore has an increased reliability, which can be constructed light-weight and compact in structure together with the electric power system, and in which communication is possible at all times.

Another object of the present invention is to provide a wireless sensor system, and a wireless sensor incorporated bearing assembly of a light-weight and compact structure utilizing such wireless sensor system, in which even when the wireless electric power supply becomes instable, the sensor output can be obtained stably and which is effective to accomplish an electric power saving.

The wireless sensor system according to a first construction of the present invention includes one or a plurality of wireless sensor units (4A, 4B) including a sensor section (6A, 6B) for detecting a target of detection, a sensor signal transmitting section (9A, 9B) for transmitting by wireless a sensor signal outputted from the sensor section (6A, 6B), and an electric power receiving section (8A, 8B) for receiving by wireless an electric operating power for driving the sensor section (6A, 6B) and the sensor signal transmitting section (9A, 9B); a sensor signal receiving section (13) for receiving the sensor signal transmitted from the sensor signal transmitting section (9A, 9B); and an electric power transmitting section (12) for transmitting an electric operating power by wireless to the electric power receiving section (8A, 8B), wherein the wireless sensor unit (4A, 4B) includes a digitalizing section (7) for digitalizing the sensor signal outputted from the sensor section (6A, 6B) and the sensor signal transmitting section (9A, 9B) transmits the digitalized sensor signal.

According to the construction described above, since the sensor signal is digitalized by the digitalizing section (7) before it is transmitted, the sensor signal is hardly affected by the disturbance, resulting in increase of the reliability of the system as a whole. Also, since the electric power receiving section (8A, 8B) is provided for receiving the electric operating power fed by wireless, there is no need to use any primary battery nor the electric power generator as an electric power source for both of the sensor section (6A, 6B) and the sensor signal transmitting section (9A, 9B) and the wireless sensor unit (4A, 4B) can be constructed light-weight and compact in structure. No replacement of the battery is required and the maintenance is therefore easy to achieve. Also, unlike the system utilizing the electric power generator, detection is possible at all times without being limited to the time during revolution.

In the wireless sensor system of the first construction described above, the plurality of the wireless sensor units (4A, 4B) may be provided and the sensor signal receiving section (13) may be capable of receiving the sensor signal from the sensor section (6A, 6B), which is transmitted from each of the wireless sensor units (4A, 4B).

In the case of this construction, since the sensor signals outputted respectively from the wireless sensor units (4A, 4B) can be received by the common sensor signal receiving section (13), the wireless sensor system as a whole can be simplified in structure.

In the wireless sensor system according to the first construction described above, the electric power transmitting section (12) may be provided in a sensor signal receiving unit (5) having the sensor signal receiving section (13).

Although the electric power transmitting section (12) and the sensor signal receiving section (13) may be provided separate from each other, inclusion of the both in the common sensor signal receiving unit (5) is effective to simplify the system.

The wireless sensor system according to the first construction described above may be of a type, in which the wireless sensor unit (4A, 4B) includes a plurality of sensors (6a, 6b, 6c) forming respective parts of the sensor section (6A, 6B). Those plural sensors (6a to 6c) may be used either for detecting the same kinds of targets of detection or for detecting different targets of detection.

In the case of this construction, since sensor signals from those plural sensors (6a to 6c) can be transmitted by the common sensor signal transmitting section (9A, 9B), the structure can be simplified and compactized while they can detect the plural targets of detection.

In the wireless sensor system according to the first construction described above, a sensor forming the sensor section (6A, 6B) may be at least one of a revolution sensor, an acceleration sensor, a vibration sensor, a temperature sensor, a load sensor, a torque sensor or a preload sensor for a bearing assembly.

Where the targets of detection includes a detected revolution signal, load, torque, acceleration and so on, not only a control of, for example, revolution of machines utilizing the bearing assembly, but any other controls can be accomplished. Where the targets of detection include temperature, vibration and preload on the bearing assembly, control of troubles occurring in the bearing assembly, state control and lifetime control can be accomplished.

Also, in the wireless sensor system according to the first construction, one of the sensor sections (6A, 6B) may include a revolution sensor which may be made up of a pulsar ring (17) and a magnetic sensor (18) of a magnetoresistance type disposed in face-to-face relation with the pulsar ring.

Since the magnetic sensor of a magnetoresistance type, if the resistance thereof is increased, is effective to minimize the electric power consumption, it is particularly advantageously employed in accomplishing the wireless electric power supply.

In such case, the revolution sensor may be a means for generating pulses, in which case the sensor signal digitalized by the digitalizing section (7) is a signal indicative of the period or the interval of the pulses.

Where the output from the revolution sensor is in the form of the pulse train, digitalization of the pulse period signal makes it possible to digitalize the sensor signal easily.

In the first construction described above, where one of the sensor sections (6A, 6B) is a revolution sensor, such revolution sensor may be a means for generating two or more pulses of different phases. In such case, the sensor signal digitalized by the digitalizing section (7) may be a signal indicative of the period of the pulses and a direction of revolution.

If the direction of revolution can be detected, a highly sophisticated control can be achieved and parameters to be controlled can increase. In such case, addition of the signal indicative of the direction of revolution to the period signal makes it possible to transmit both of the number of revolutions and the direction of revolution with a minimized number of bits.

In the first construction described above, where the plural wireless sensor units (4A, 4B) are employed, each of the wireless sensor units (4A, 4B) may be so designed as to allow the sensor signal transmitting section (9A, 9B) to transmit, in addition to the sensor signal, an identifying signal indicative of the individual wireless sensor unit (4A, 4B).

Also, where the wireless sensor unit (4A, 4B) includes the plural sensors as the sensor section (6A, 6B), the wireless sensor unit (4A, 4B) may be so designed as to transmit, in addition to the sensor signal, an identifying number indicative of the individual sensor forming a part of the sensor section (6A, 6B).

When the sensor signal is digitalized, the identifying number can be transmitted easily for each of the wireless sensor units (4A, 4B) and the plural wireless sensor units (4A, 4B) can be identified with the electromagnetic waves of the single frequency and, therefore, the system construction can be simplified. Where the sensor section (6A, 6B) of each of the wireless sensor units (4A, 4B) includes a plurality of sensors, addition of the identifying number indicative of the corresponding sensor enables such sensor to be easily and reliably identified.

In the wireless sensor system according to the first construction described above, the sensor signal transmitting section (9A, 9B) may transmit the sensor signal by means of a spread spectrum communication scheme.

Where the transmission is made by means of the spread spectrum communication scheme, distinction of the sensor signal can easily be made from the electromagnetic waves which are used to transmit the electric power by wireless and which are continuous waves of non-modulated waves, resulting in increase of the reliability of the system. Also, transmission of the sensor signal by means of the spread spectrum communication scheme makes it possible to use the electromagnetic waves of the same frequency range for transmission of the sensor signal and also for transmission of the electric power and, therefore, the same high frequency component parts can be used in, for example, antennas, resulting in reduction of the cost.

A bearing assembly incorporated with the wireless sensor system according to the first construction is a bearing assembly having mounted thereon the wireless sensor unit (4A, 4B) employed in the wireless sensor system according to the first construction described above. The bearing assembly referred to above may be, for example, a rolling bearing assembly including an outer member, an inner member and a plurality of rolling elements interposed between the outer and inner members.

In the case of this construction, mounting on the bearing assembly of the sensor section (6A, 6B), the sensor signal transmitting section (9A, 9B) and the electric power receiving section (8A, 8B) can render the bearing assembly to be intelligent, the wiring system to be simplified and to be lightweight and compact in structure and, yet, the provision of the digitalizing section (7) can render the sensor signal to be robust against influence brought about by disturbances, accompanied by increase of the reliability of the sensor signal.

In the wireless sensor system incorporated bearing assembly one of sensors forming respective part of the sensor section (6A, 6B) may be a preload sensor for the bearing assembly. In such case, the preload on the bearing assembly can be monitored and countermeasure against any trouble of the preload, which would considerably affects the lifetime of the bearing assembly, can readily be taken.

In the wireless sensor system incorporated bearing assembly according to the first construction described above, the rolling bearing assembly referred to above may be a wheel support bearing assembly for rotatably supporting a vehicle wheel relative to a vehicle body structure, which assembly includes an outer member having a plurality of raceways, an inner member having raceways aligned with the raceway referred to above, and a plurality of rows of rolling elements interposed between the raceways in the outer member and the raceways in the inner member, respectively.

In the case of this construction, it is possible to render the wheel support bearing assembly to be intelligent and, while the necessity of use of any harness between the vehicle wheel and the vehicle body structure can be eliminated, increase of the control reliability, brought about by increase of the reliability of the sensor signal, and increase of the safety factor can be achieved.

The wireless sensor system according to a second construction of the present invention includes one or a plurality of wireless sensor units (4A, 4B) including a sensor section (6A, 6B) for detecting a target of detection, a sensor signal transmitting section (9A, 9B) for transmitting by wireless a sensor signal outputted from the sensor section (6a, 6B), and an electric power receiving section (8A, 8B) for receiving by wireless an electric operating power for driving the sensor section (6A, 6B) and the sensor signal transmitting section (9A, 9B); a sensor signal receiving section (13) for receiving the sensor signal transmitted from the sensor signal transmitting section (9A, 9B); and an electric power transmitting section (12) for transmitting an electric operating power by wireless to the electric power receiving section (8A, 8B); in which the wireless sensor unit (4A, 4B) includes an electric power accumulating device (27) for accumulating the electric power received by the electric power receiving section (8A, 8B). The accumulating device (27) referred to above may be employed in the form of either a capacitor or a secondary battery. Transmission and reception of the sensor signal and the electric operating power may be carried out by the use of, other than the electromagnetic waves, magnetic coupling, light waves, infrared beams, ultrasonic waves or any other medium that can be done by wireless.

According to this construction, since provision is made of the electric power receiving section (8A, 8B) for receiving the electric operating power by wireless, there is no need to employ either the primary battery or the electric power generator as an electric power source of the sensor section (6A, 6B) and the sensor signal transmitting section (9A, 9B) and, therefore, the wireless sensor unit (4A, 2B) can be constructed lightweight and compact in structure. Since no replacement of the battery is needed, the maintenance can become easy, too. Also, since the accumulating device (27) such as, for example, the capacitor or the secondary battery for accumulating the electric power received by the electric power receiving section (8A, 8B) is employed, part of the electric power received by the electric power receiving section (8A, 8B), which is left unused, can be accumulated during normal times, and at the time the wireless electric power supply is instable, the electric power stored in the capacitor or the secondary battery can be utilized for driving the sensor section (6A, 6B) and the sensor signal transmitting section (9, 9B). For this reason, there is no need to transmit a large electric power on a steady basis in anticipation of the instability of the wireless electric power supply and, thus, the electric power consumption of the wireless sensor system can be minimized. Where the capacitor is used for the electric power accumulating device (27), the capacitor of a capacity enough to substantially eliminate the instability in the wireless electric power supply is used. Since even where the secondary battery is used, the secondary battery may be of a capacity enough to compensate for the instability in the wireless electric power supply, it may be of a lightweight and compact size as compared with the use of the primary battery and, also, no replacement of the battery is needed.

A bearing assembly incorporated with the wireless sensor system according to the second construction described above may be of a type, in which a rolling bearing assembly including an inner member, an outer member, a plurality of rolling elements interposed between the inner member and the outer member, and the wireless sensor system according to the second construction mounted thereon, which is provided with an electric power accumulating device (27) such as, for example, a capacitor or a secondary battery for accumulating the electric power received by the electric power receiving section (8A, 8B).

In the case of this construction, mounting, on the bearing assembly, of the sensor section (6A, 6B), the sensor signal transmitting section (9A, 9B) and the electric power receiving section (8A, 8B), can render the bearing assembly to be intelligent and the wiring system to be simplified while being constructed lightweight and compact in size and, yet, the provision of the accumulating device (27) such as, for example, the capacitor or the secondary battery ensures a stable securement of the electric power with the electric power consumption of the wireless electric power supply being minimized consequently.

In the wireless sensor incorporated bearing assembly according to the second construction described above, the sensor referred to above may be operable to detect, as a target of detection, one of revolution of the rolling bearing assembly, temperature, acceleration, load, torque, or bearing preload.

If the target of detection is one of revolution of a rolling bearing assembly, acceleration, load or torque, a control of revolution of a machine having the bearing assembly employed therein and any other control can be carried out. On the other hand, if the target of detection is temperature, vibration or bearing preload, control of a trouble in the bearing assembly, state control and lifetime control can be carried out.

Also, in the wireless sensor incorporated bearing assembly according to the second construction described above, the rolling bearing assembly may be a wheel support bearing assembly for rotatably supporting a vehicle wheel relative to a vehicle body structure, which includes an outer member having a plurality of raceways, an inner member having raceways aligned with the raceways referred to above, respectively, and a plurality of rolling elements interposed between the raceways in the outer member and the raceways in the inner member, respectively.

In the case of this construction, it is possible to render the wheel support bearing assembly to be intelligent and, while the necessity of use of any harness between the vehicle wheel and the vehicle body structure can be eliminated, the electric power can be stably supplied to the sensor section (6A, 6B) and also to the sensor signal transmitting section (9A, 9B), a stable control can be achieved and the consumption of the electric power supplied by wireless can be minimized.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1:
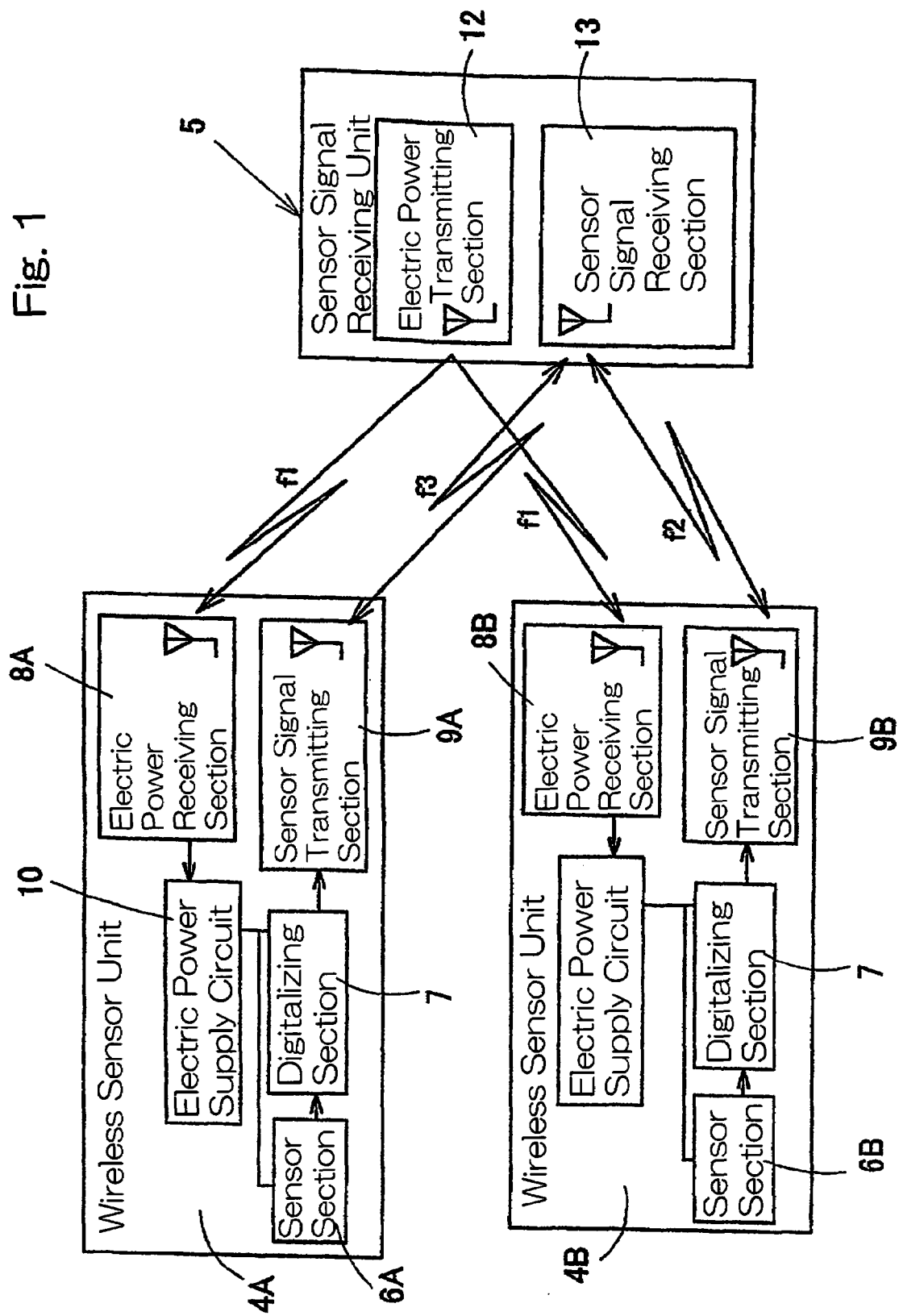
FIG. 1 is a block diagram showing a conceptual structure of a wireless sensor system according to a first preferred embodiment of the present invention.

The wireless sensor system according to a first preferred embodiment of the present invention will be described in detail with particular reference to FIG. 1. This wireless sensor system shown therein includes a plurality of wireless sensor units 4A and 4B and a sensor signal receiving unit 5 for supplying an electric power by wireless to each of the plural wireless sensor units 4A and 4B and also for receiving respective sensor signals transmitted from the wireless sensor units 4A and 4B. The number of the wireless sensor units is not specifically limited and one or three or more wireless sensor units may be employed, but in the embodiment shown therein, two wireless sensor units are shown as employed.

Each of the wireless sensor units 4A and 4B includes a sensor section 6A or 6B, a digitalizing section 7 for converting a sensor signal, outputted from the corresponding sensor section 6A or 6B into a digital sensor signal, a sensor signal transmitting section 9A or 9B for transmitting the digitalized sensor signal by wireless, an electric power receiving section 8A or 8B for receiving an electric driving power which has been transmitted by wireless, and an electric power supply circuit 10.

Each of the sensor sections 6A and 6B may include one or a plurality of sensors. The sensor forming each of those sensor sections 6A and 6B may be a revolution sensor, an acceleration sensor, a temperature sensor, a vibration sensor, a load sensor, a torque sensor, or a preload sensor for detecting a preload acting in a bearing assembly.

The electric power supply circuit 10 is a circuit operable to supply an electric power, which has been received through the corresponding electric power receiving section 8A or 8B, to each of the corresponding sensor section 6A or 6B, the corresponding digitalizing section 7, and the corresponding sensor signal transmitting section 9A or 9B. This electric supply circuit 10 may include, although not shown, a capacitor and a secondary battery for accumulating the received electric power, and a charging circuit therefor.

The sensor signal receiving unit 5 includes a sensor signal receiving section 13 for receiving a sensor signal transmitted from each of the sensor signal transmitting sections 9A and 9B in the wireless sensor unit 4A and 4B, and an electric power transmitting section 12 for transmitting by wireless an electric operating power to each of the electric power receiving sections 8A and 8B in the wireless sensor units 4A and 4B.

Transmission and reception between the sensor signal transmitting sections 9A and 9B and the sensor signal receiving section 13 and those between the electric power transmitting section 12 and the electric power receiving sections 8A and 8B may be carried out by the use of electromagnetic waves, light waves, infrared beams, ultrasonic waves or magnetic coupling.

The electric power transmitting section 12 makes use of, for example, electromagnetic waves, which are continuous waves of non-modulated waves. Where the wireless electric power supply is carried out by the use of electromagnetic waves, each of the electric power receiving sections 8A and 8B includes a tuning circuit and a detecting and rectifying circuit.

By way of example, as shown therein, each sensor signal and the electric power, both supplied by wireless, have different frequencies relative to each other and, also, the plural sensor signals employed have different frequencies relative to each other. In the illustrated embodiment, the electric power supplied by wireless has a frequency denoted by f1, and the sensor signals have respective frequencies denoted by f2 and f3. However the frequency of each sensor signal and that of the electric power supplied by wireless may be the same, in which case, the sensor signal has to be transmitted by the use of a spread spectrum communication technique as will be described later.

Figure 2:
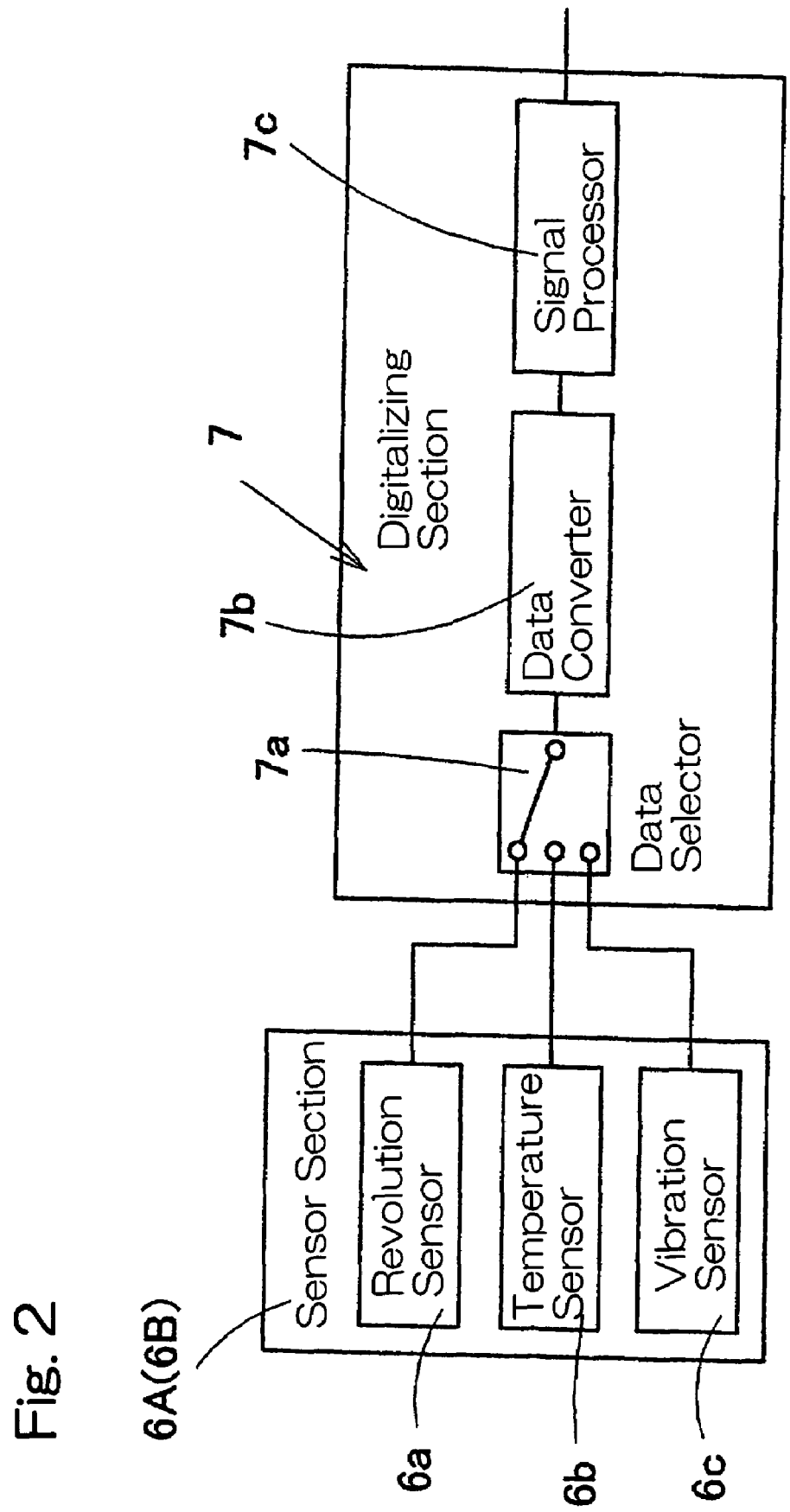
FIG. 2 is a block diagram showing the details of an internal structure of a digitalizing section employed in the wireless sensor system according to the first preferred embodiment.

Each of the digitalizing section 7 includes, for example, a data selector 7a, a data converter 7b and a signal processor 7c as shown in FIG. 2. The data selector 7a is employed where each of the sensor sections 6A and 6B includes a plurality of sensors 6a, 6b and 6c, and is operable to select data, fed respectively from the sensors 6a, 6b and 6c, one at a time so that the data converter 7b can receive one of those data. In the illustrated embodiment shown therein, the use of a plurality of sensors 6a to 6c is shown and those sensors 6a to 6c are shown as a revolution sensor, a temperature sensor and a vibration sensor, respectively. Data selection performed by the data selector 7a may be accomplished either cyclically by means of, for example, a timer or in response to a suitable switching command.

The data converter 7b serves to convert an analog signal, inputted thereto, into a digital signal.

The signal processor 7c is, where the plural wireless sensor units 4A and 4B are employed in association with the common sensor signal receiving section 13 (FIG. 1), operable to apply an identifying number unique to each of the wireless sensor units 4A and 4B. Where only one wireless sensor unit is employed, no identifying number is required. Also, this signal processor 7c is, where each of the sensor sections 6A and 6B in the respective wireless sensor unit 4A and 4B includes the plural sensors 6a to 6c, operable to apply an identifying number required to identify one of the sensors 6a to 6c. Those wireless sensor unit identifying numbers and sensor identifying numbers are added to the sensor signal to be transmitted. This signal processor 7c may have a redundant bit such as, for example, an error correcting code added thereto.

A signal digitalized by the digitalizing section 7 is transmitted by wireless from the corresponding sensor signal transmitting section 9A or 9B by means of electromagnetic waves of predetermined frequencies f1 and f2. This transmission may be carried out by the use of, other than the electromagnetic waves, light waves, infrared beams, ultrasonic waves or magnetic coupling as referred to above.

Transmission from the sensor signal transmitting sections 9A and 9B are carried out by means of, for example, the spread spectrum communication technique. The system thereof may be either the frequency hopping spread spectrum system or the direct sequence spread spectrum system.

The sensor signal transmitting sections 9A and 9B may transmit their sensor signals on a time sharing basis in the order of the respective wireless sensor units 4A and 4B. Also, arrangement may be made that a request command for data communication can be fed from a communication request transmitter (not shown), provided in the sensor signal receiving unit 5, to the wireless sensor units 4A and 4B one at a time and that one of the wireless sensor units 4A and 4B whichever received the request command from the sensor signal receiving unit 5 can transmit the sensor signal. Where the transmission takes place on the time sharing basis or in response to the request command, communication between the sensor signal receiving unit 5 and the wireless sensor units 4A and 4B can take place with no interference even though the wireless sensor units 4A and 4B utilize the same transmission frequency. Also, where the wireless sensor units 4A and 4B transmit the respective sensor signals with the unique identifying numbers added thereto, the sensor signals from those wireless sensor units 4A and 4B can be identified individually.

The spread spectrum communication is robust against disturbance and interference and, accordingly, even though radio waves of a frequency falling within the same range of frequencies as those of the electric power transmitting electromagnetic waves, which are continuous wave of non-modulated waves, a sufficient reliability can be secured. When the electromagnetic waves of the same frequency range are used, the same high frequency component parts can be employed for component parts such as, for example, antennas, in the electric power receiving sections 8A and 8B and the sensor signal transmitting sections 9A and 9B, resulting in reduction of the cost incurred by the component parts.

Also, a unique frequency of the sensor signal transmitting electromagnetic waves may be fixed for each of the wireless sensor units 4A and 4B and the sensor signal receiving section 13 of the sensor signal receiving unit 5 may have an individual receiver (not shown) corresponding to the frequency unique to each of the wireless sensor units 4A and 4B.

Each of the sensor signal transmitting sections 9A and 9B may be of a type in which transmission of the sensor signal is carried out with a carrier wave that is digital-modulated by means of, for example, ASK (Amplitude Shift Keying), FSK (Frequency Shift Keying), PSK (Phase Shift Keying) or QPSK (Quadrature PSK).

According to the wireless sensor system of the foregoing construction, since the electric operating power can be supplied by wireless to each of the wireless sensor units 4A and 4B, neither a primary battery nor an electric power generator need be employed as an electric power source for the sensor sections 6A and 6B and the sensor signal transmitting sections 9A and 9B and, accordingly, the wireless sensor units 4A and 4B can be constructed compact and lightweight. Elimination of the necessity of replacement of the battery facilitates the maintenance. Also, unlike the electric power generation, communication is possible at all times.

Also, since the sensor signals are digitalized by the respective digitalizing section 7 before they are transmitted, the reliability of the system can increase without being almost affected by the disturbances. Since digitalization of the sensor signals makes it easy for the identifying numbers of the respective wireless sensor units 4A and 4B to be transmitted and the plural wireless sensor units 4A and 4B can be individually identified with the electromagnetic waves of the same frequency, the system construction can be simplified. Where each of the sensor sections 6 of the wireless sensor units 4A and 4B includes the plural sensors 6a to 6c, and if the identified numbers are applied respectively to those sensors 6a to 6c, identification of each of those sensors 6a to 6c can be accomplished easily.

Where the digitalized sensor signal is transmitted using the spread spectrum communication system, distinction from the electric power transmitting electromagnetic waves, which are continuous waves of non-modulated waves, can be made easily, resulting in increase of the reliability of the system. Also, transmission of the sensor signals using the spread spectrum communication system makes it possible to use the radio waves of the same frequency range as those for transmission and electric power supply and, therefore, component parts can be commonly shared, resulting in reduction of the cost.

Figure 4:
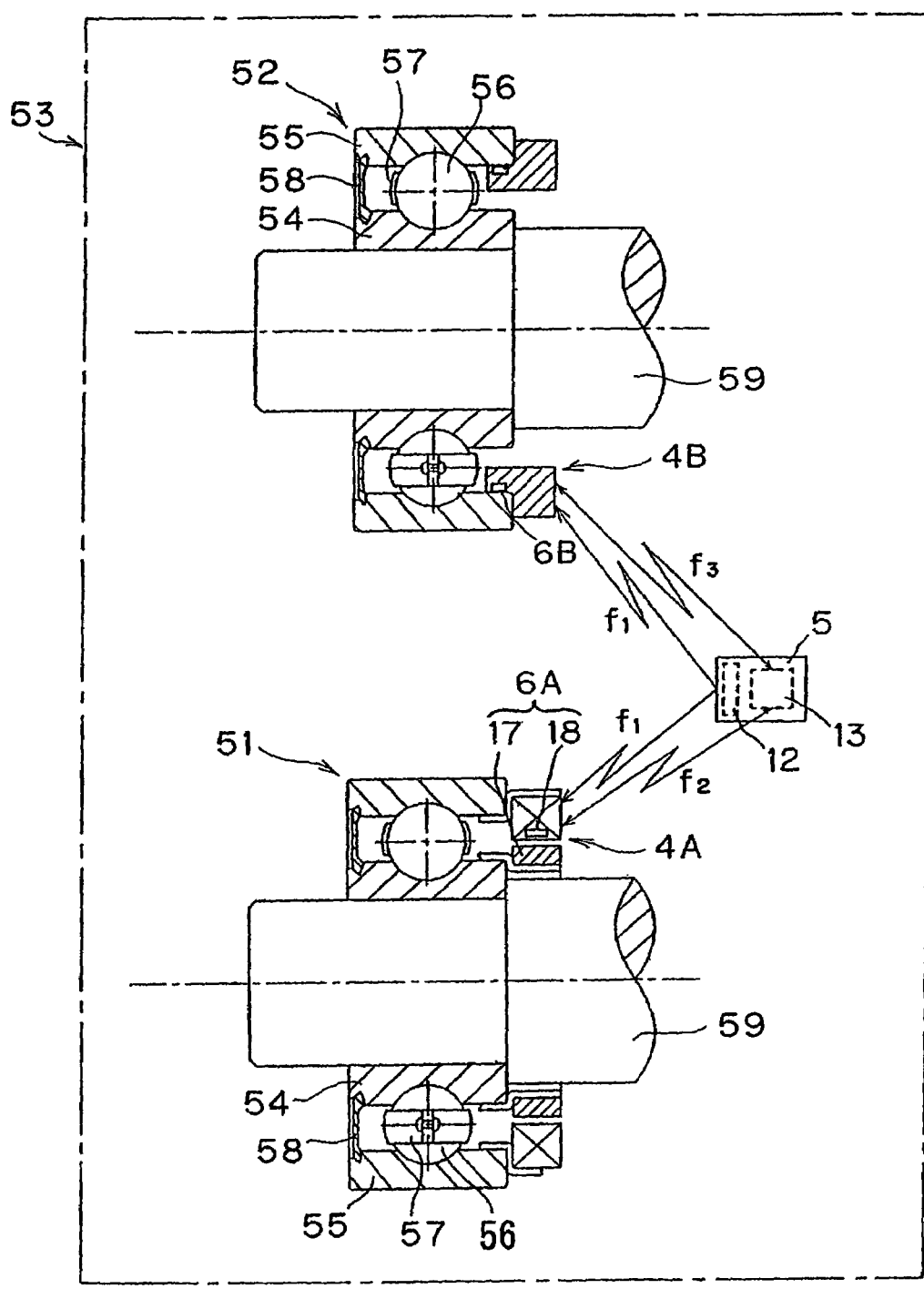
FIG. 4 is a longitudinal sectional view of a bearing assembly to which the wireless sensor system according to the first preferred embodiment is applied.

An example of a bearing assembly having the wireless sensor built therein, to which the wireless sensor system according to the foregoing first embodiment is applied, will now be described with particular reference to FIG. 4. The wireless sensor units 4A and 4B are mounted on respective bearing assemblies 51 and 52, and the single sensor receiving unit 5 operates to supply an electric power by wireless to each of the wireless sensor units 4A and 4B and also to receive the sensor signal from each of the wireless sensor units 4A and 4B. The rolling bearing assemblies 51 and 52 are those installed in different locations in a machinery equipment 53. The machinery equipment 53 is, for example, a conveyor line including, for example, a roller conveyor or a belt conveyor, and a rotary shaft 59 such as a shaft used as a transport roller or a belt drive roller is rotatably supported by each of the bearing assemblies 51 and 52. Each of the bearing assemblies 51 and 52 is in the form of a rolling bearing assembly including a row of rolling elements 56 interposed between an inner race 54 and an outer race 55 and provided with a sealing member 58. The rolling elements 56 in each of the bearing assemblies 51 and 52 are retained by a roller retainer 57. The inner race 54 and the outer race 55 correspond to an inner member and an outer member that are referred to in the appended claims. The sensor signal receiving unit 5 is positioned remote from the bearing assemblies 51 and 52.

The sensor section 6A of one 4A of the wireless sensor units 4A and 4b that are mounted on the respective bearing assemblies 51 and 52 is in the form of a revolution sensor, while the sensor section 6B of the other 4B of the wireless sensor units 4A and 4B are in the form of a sensor capable of detecting a target of detection other than the revolution, for example, a temperature sensor, a vibration sensor, an acceleration sensor, a load sensor, a torque sensor, or a preload sensor of the bearing assembly. By detecting respective statuses of the bearing assemblies 51 and 52 with those sensor sections attached thereto, they can be used for troubleshooting of the bearing assemblies 51 and 52 and plant line monitoring.

The wireless sensor units 4A and 4B are given the respective identifying number and feed respective sensor signals with those identifying numbers added thereto. Where each of the sensor sections 6A and 6B of those wireless sensor units 4A and 4B includes a plurality of sensors, arrangement has to be made so that those sensors can feed respective sensor signals with respective identifying numbers added thereto.

The sensor section 6A that serves as a revolution sensor includes a pulsar ring 17 and a magnetic sensor member 18 disposed in face-to-face relation with the pulsar ring 17. The pulsar ring 17 is of a type having a cyclical change in a direction circumferentially of the pulsar ring 17 and is such as, for example, a magnet magnetized to have a plurality of alternating magnetic poles deployed in a direction circumferentially thereof or a magnetic ring having gear-like serrations. The magnetic sensor member 18 detects a cyclic magnetic change in the circumferential direction of the pulsar ring 17 to detect a revolution of one of the inner race 54 and the outer race 55 relative to the other and subsequently outputs a revolution signal. While this revolution signal is in the form of a train of pulses, the cyclic data of the pulse train is digitalized by the corresponding digitalizing section 7 (shown in FIG. 1) before it is transmitted. The magnetic sensor member 18 is a magnetic field sensor and may be employed in the form of a magnetoresistance sensor (generally referred to as "MR sensor"), or an active magnetic sensor such as, for example, a Hall element sensor, a flux gate magnetic sensor or MI sensor.

Figure 3A:
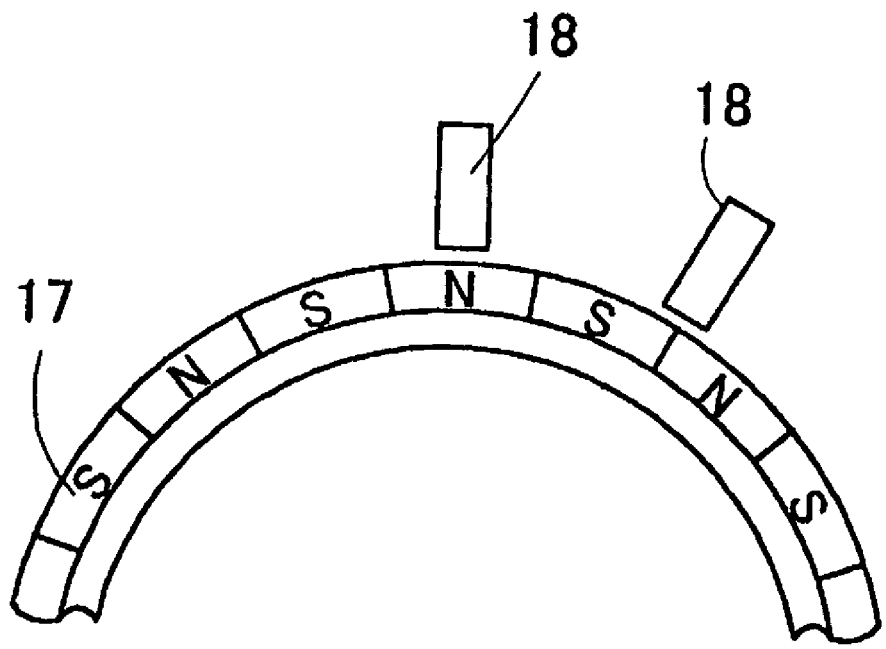
FIG. 3A is an explanatory diagram showing a revolution sensor of a sensor unit employed in the wireless sensor system according to the first preferred embodiment.
Figure 3B:
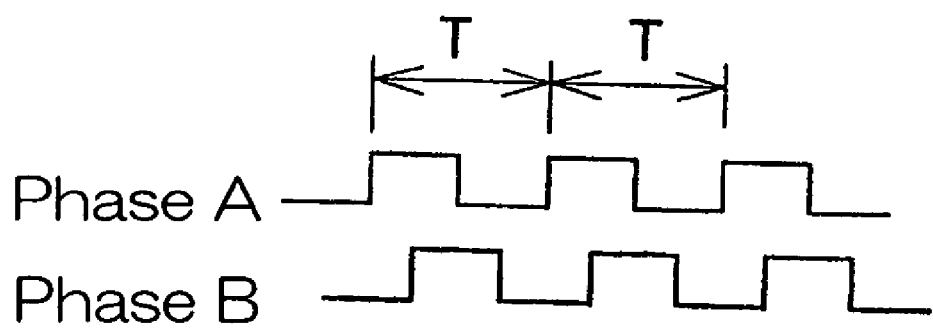
FIG. 3B is a chart showing respective waveforms of output pulses emerging from the revolution sensor.
Figure 3C:
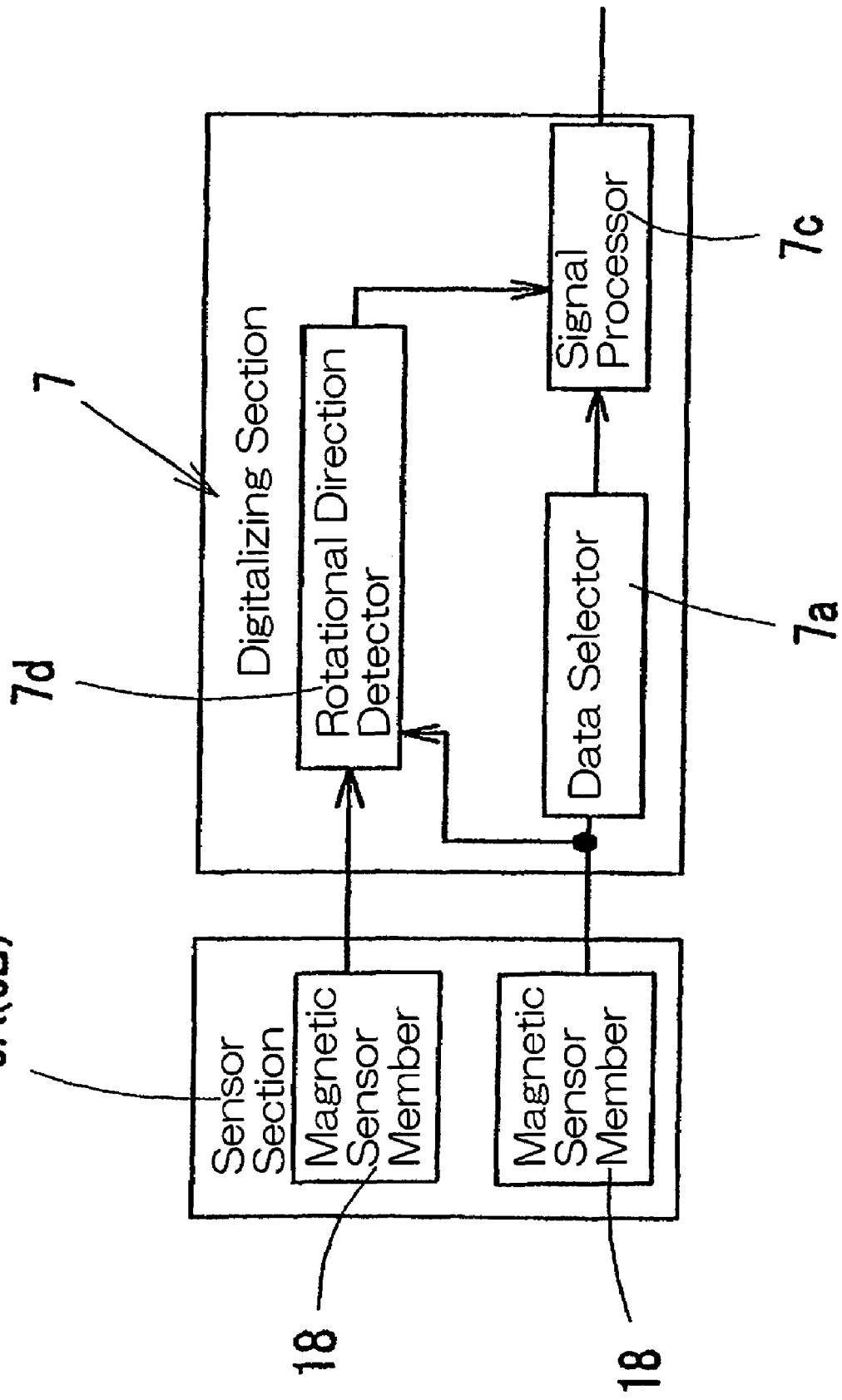
FIG. 3C is a block diagram showing the details of the internal structure of a modified form of the digitalizing section.

The magnetic sensor member 18 may be disposed at two locations spaced substantially 90° in phase from each other with respect to the cycle of the magnetic change in the circumferential direction of the pulsar ring 17, as shown, for example, in FIG. 3A, so that the direction of revolution can be detected and, in addition to the cyclic data, data on the direction of revolution can also be transmitted. In such case, the revolution signals in the form of two trains of pulses (phase A and phase B) displaced substantially 90° from each other as shown, for example, in FIG. 3B can be outputted from the magnetic sensor member 18 and 18, respectively. Detection of the direction of revolution can be accomplished when a rotational direction detector 7d incorporated in the digitalizing section 7 as shown, for example, in FIG. 3C compares the two pulse trains with each other. A process of obtaining data on the cycle period T from the pulse trains is performed in, for example, the data converter 7B. This data on the cycle period T is processed to be collected together with the data on the direction of revolution by means of the signal processor 7c.

The magnetic sensor member 18 is preferably employed in the form of a magnetoresistance type. The magnetoresistance type magnetic sensor is effective to minimize the electric power consumption when the resistance is of a high value and can advantageously be employed in accomplishing the wireless supply of the electric power.

According to the bearing assembly having the built-in wireless sensor as described above, incorporation of the sensor sections 6A and 6B renders the corresponding bearing assemblies 51 and 52 to be intelligent and wireless transmission of the sensor signals and the electric power renders the wiring system to be simplified. Also, since the sensor signals are transmitted after they have been digitized, the system can be robust against the disturbances and can therefore have an increased reliability.

Figure 5:
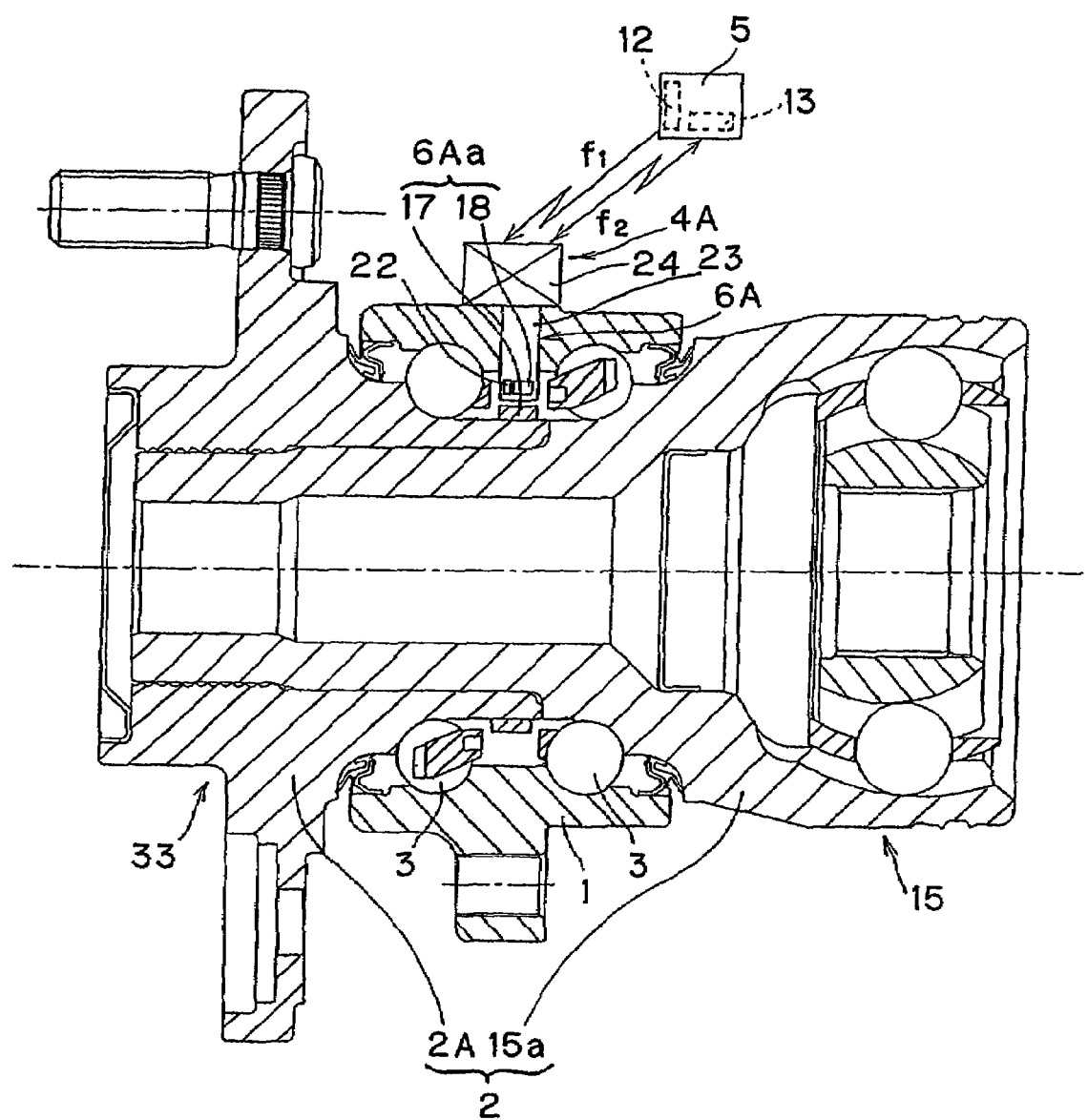
FIG. 5 is a longitudinal sectional view of a wheel support bearing assembly to which the wireless sensor system according to the first preferred embodiment is applied.

Application of the wireless sensor system according to the previously described first embodiment to a wheel support bearing assembly for an automotive vehicle is shown in FIG. 5. The illustrated wheel support bearing assembly 33 includes an outer member 1 having a plurality of raceways, an inner member 2 having raceways aligned with the above described raceways, and dual rows of rolling elements 3 interposed between the raceways in the outer member 1 and the raceways in the inner member 2 and is so designed as to rotatably support a vehicle wheel relative to a vehicle body structure.

The wheel support bearing assembly 33 shown therein is of a fourth generation type, in which the inner member 2 is made up of a hub axle 2A and an outer race 15a of a constant velocity joint 15, with the raceways in the inner member 2 defined in the hub axle 2A and the constant velocity joint outer race 15a, respectively.

One of the wireless sensor units, for example, the wireless sensor unit 4A is mounted on the outer member 1 of the wheel support bearing assembly 33. The other wireless sensor unit 4B shown in FIG. 1 may not be employed or may alternatively employed in a vehicle wheel, separate from the wheel support bearing assembly 33, for example, for detecting the tire pressure.

The wireless sensor unit 4A includes, as a single sensor member forming the sensor section 6A, a revolution sensor 6Aa. This revolution sensor 6Aa is made up of a pulsar ring 17 and a magnetic sensor member 18 disposed in face-to-face relation with the pulsar ring 17. The pulsar ring 17 is of a type having a cyclical change in a direction circumferentially of the pulsar ring 17 and is such as, for example, a magnet magnetized to have a plurality of alternating magnetic poles deployed in a direction circumferentially thereof or a magnetic ring having gear-like serrations. The magnetic sensor member 18 detects a cyclic magnetic change in the circumferential direction of the pulsar ring 17 to thereby detect a revolution of one of the inner and outer members 2 and 1 relative to the other of the inner and outer members 2 and 1 and subsequently outputs a revolution signal. While this revolution signal is in the form of a train of pulses, the cycle data of the pulse train is digitalized before it is transmitted. The magnetic sensor member 18 is a magnetic field sensor and may be employed in the form of a magnetoresistance sensor (generally referred to as "MR sensor"), or an active magnetic sensor such as, for example, a Hall element sensor, a flux gate magnetic sensor or MI sensor. The magnetic sensor member 18 may be disposed at two locations spaced substantially 90° in phase from each other with respect to the cycle of the magnetic change in the circumferential direction of the pulsar ring 17, as shown, for example, in FIG. 3A, so that the direction of revolution can be detected and, in addition to the cycle data, data on the direction of revolution can also be transmitted.

The wireless sensor unit 4A is of a unitary structure, in which a circuit box 24 and a sensor installation 23 are integrated together, with the circuit box 24 disposed in an outer surface of the outer member 1. The sensor installation 23 is situated within a radial hole, defined in the outer member 1, so as to communicate with an annular bearing space delimited between the inner and outer members 2 and 1. Within the circuit box 24, a communication functionality including the electric power receiving section 8A and the sensor signal transmitting section 9A, the digitalizing section 7 and the electric power supply circuit 10, all shown in FIG. 1, are incorporated, and the magnetic sensor member 18 is disposed in the sensor installation 23. The sensor installation 23 accommodates, as a different sensor forming another part of the sensor section 6A, a sensor member 22 capable of detecting information other than that on the revolution. This sensor member 22 may be, for example, a temperature sensor, a vibration sensor, a load sensor or a preload sensor.

The sensor signal receiving unit 5 is mounted on the vehicle body structure. For example, it may be fitted to a tire housing forming a part of the vehicle body structure. The sensor signal received by the sensor signal receiving unit 5 is supplied to an electric control unit (ECU) disposed in the vehicle body structure to control the vehicle in its entirety and are used for various controls and abnormality monitoring.

The revolution sensor 6Aa includes the pulsar ring 17 and the magnetic sensor member 18 for the detection of revolutions and can detect the revolution until a zero speed since it is supplied an electric power by wireless and, also, it can be used with, for example, an anti-skid brake system and/or a traction control. By detecting the direction of revolution, it can be used for a hill hold control, for example, a control corresponding to detection of rearward movement of the automotive vehicle during ascending run or the reverse.

With the other sensor member 22 such as, for example, a load sensor or a temperature sensor, a parameter other than the revolution can be detected and, therefore, the bearing assembly can be designed to be functionally intelligent, allowing it to be used for the troubleshooting of the bearing assembly and also for the various automatic controls.

When as described hereinabove, the wireless sensor system of the present invention is used in association with the wheel support bearing assembly 33, the wheel support bearing assembly 33 can be rendered to be intelligent and a combined use of the wireless transmission of the sensor signals and a wireless supply of the electric power is effective to eliminate the use of any harness, which may extend between the vehicle wheel and the vehicle body structure, to accomplish a highly reliable automobile control through digitalization of the sensor signals.

Figure 6:
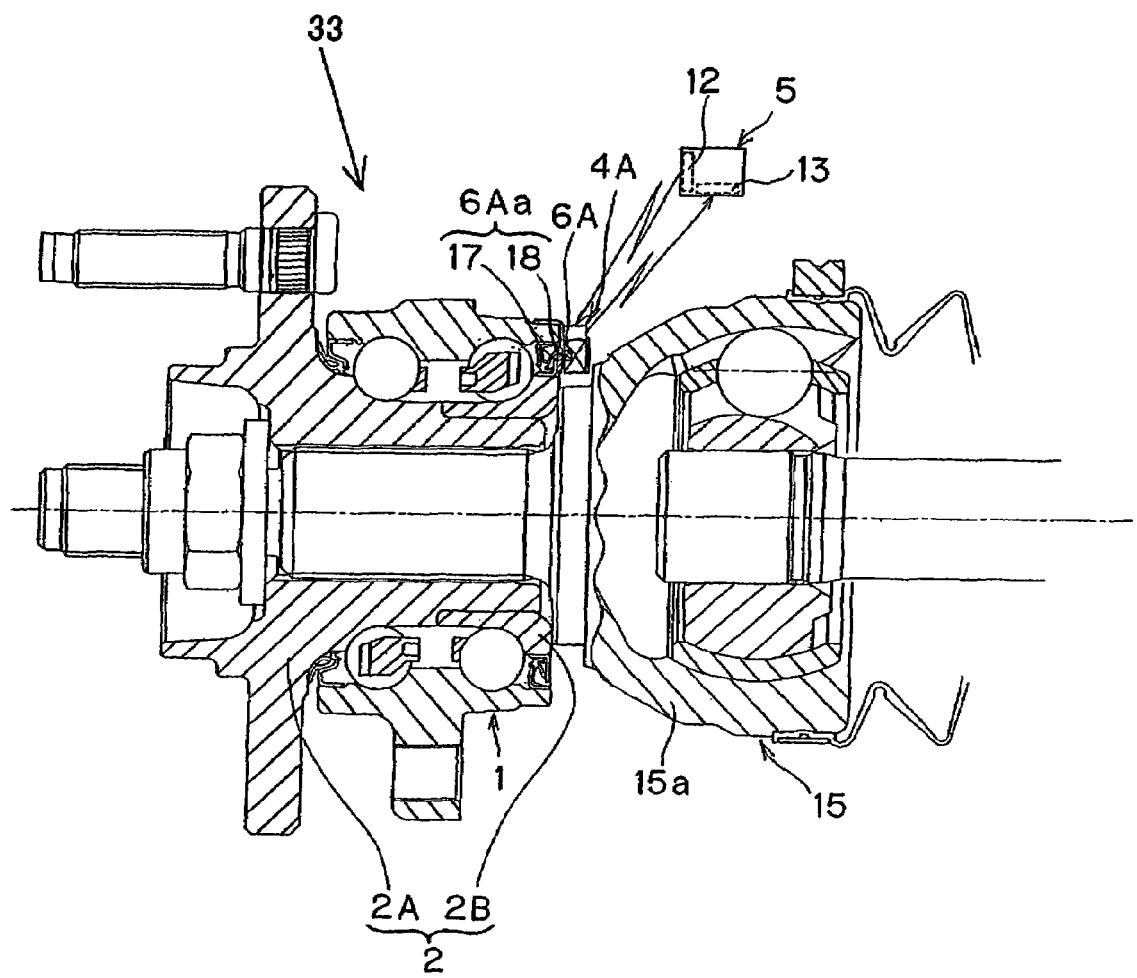
FIG. 6 is a longitudinal sectional view of a modified form of the wheel support bearing assembly to which the wireless sensor system according to the first preferred embodiment is applied.

FIG. 6 illustrates an application of the wireless sensor system according to the previously described first embodiment to a different type of wheel support bearing assembly. This wheel support bearing assembly 33 is of a third generation type, in which the inner member 2 is made up of a hub axle 2A and an inner race segment 2B mounted externally on one end of the hub axle 2A, with the raceways in the inner member 2 defined on the peripheral surfaces in the hub axle 2A and the inner race segment 2B, respectively. The constant velocity joint 15 includes an outer race 15a having a shaft portion inserted in an axial bore of the hub axle 2A and firmly fastened thereto by means of a nut member.

The wireless sensor unit 4A is mounted on one end of the outer member 1. The sensor section 6A of the wireless sensor unit 4A includes a revolution sensor 6Aa, which in turn includes a pulsar ring 17 mounted on the inner member 2, and a magnetic sensor member 18 disposed in face-to-face relation with the pulsar ring 17. The pulsar ring 17 may be in the form of a multipolar magnet or the like. This pulsar ring 17 is provided as a part of a sealing member used to seal an annular bearing space delimited between the outer member 1 and the inner member 2. The magnetic sensor member 18 may be in the form of a magnetoresistance sensor or a Hall element sensor. Other structural features are substantially similar to those shown in and described with reference to FIG. 3.

Figure 7:
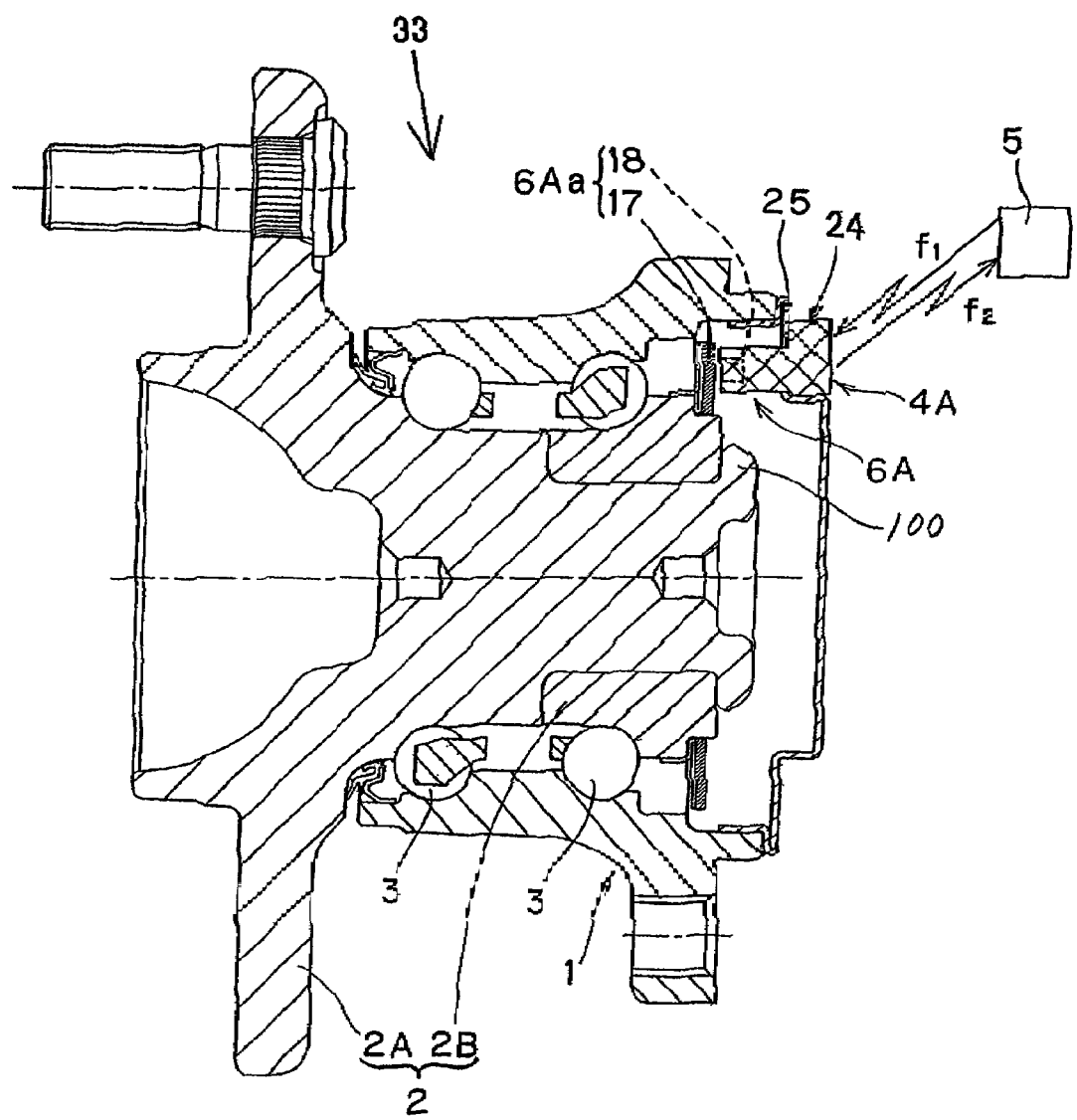
FIG. 7 is a longitudinal sectional view of another modified form of the wheel support bearing assembly to which the wireless sensor system according to the first preferred embodiment is applied.

FIG. 7 illustrates an application of the wireless sensor system according to the previously described first embodiment to a further different type of wheel support bearing assembly. This wheel support bearing assembly 33 is of a third generation type used for rotatably supporting a vehicle driven wheel. In this embodiment, the wireless sensor unit 4A is fitted to a cover 25 used to cover a bearing end. The wireless sensor unit 4A includes a sensor section 6A in the form of a revolution sensor 6Aa made up of a pulsar ring 17 and a magnetic sensor member 18. The sensor section 6A including the magnetic sensor member 18 has its free end inserted into a hole defined in the cover 25, and a circuit box 24 mounted on an outer surface of the cover 25. Other structural features of this embodiment are substantially similar to those shown in and described with reference to FIG. 6. It is to be noted that the inner race segment 2B is rigidly coupled with the hub axle 2A by means of a crimped portion 100 formed by crimping that end of the hub axle 2A.

Figure 8:
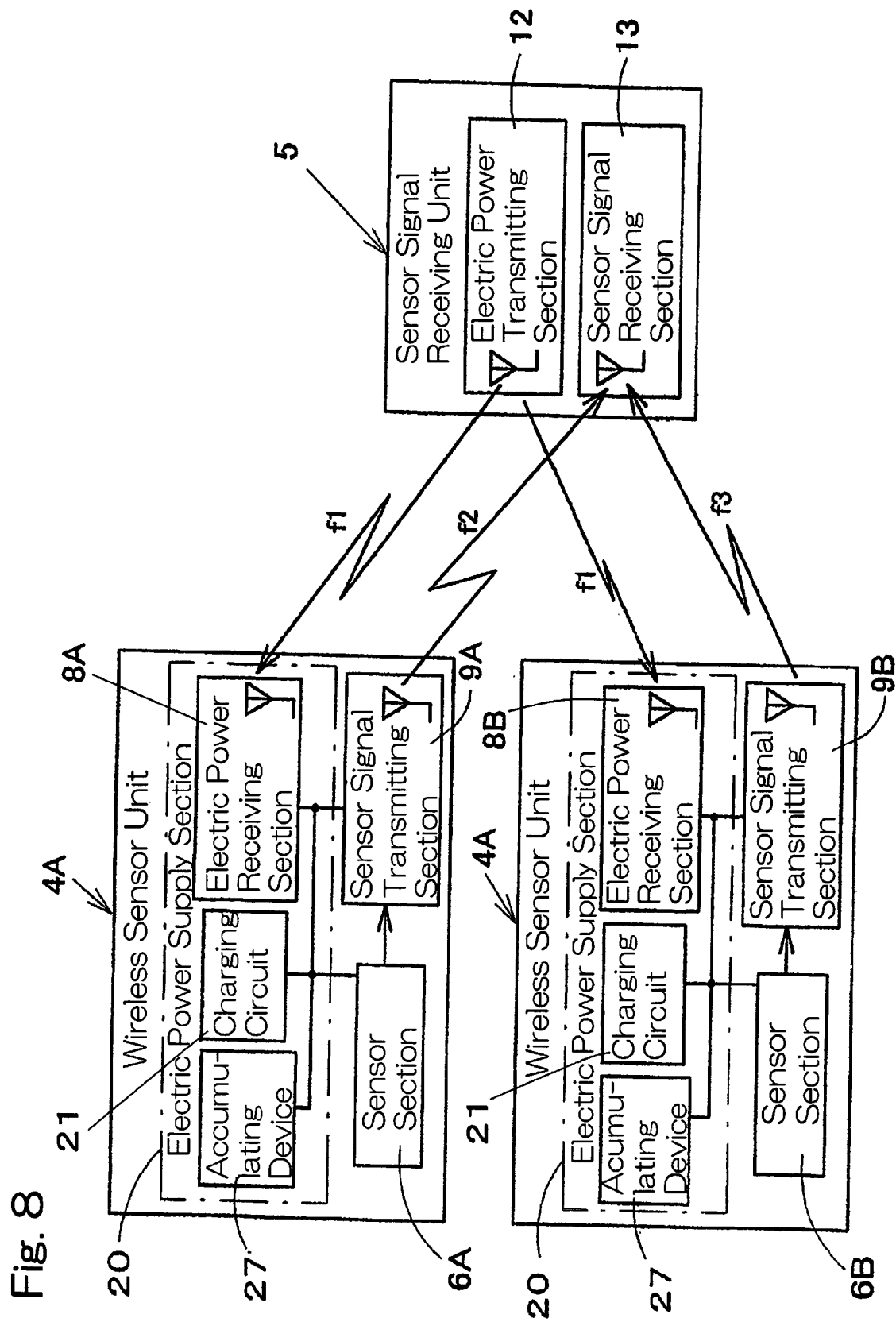
FIG. 8 is a block diagram showing a conceptual structure of the wireless sensor system according to a second preferred embodiment of the present invention.

FIG. 8 illustrates the wireless sensor system according to a second preferred embodiment of the present invention. The wireless sensor system according to this second embodiment is similar to that according to the first embodiment, except that no digitalizing section identified by 7 in connection with the first embodiment is employed. Also, in place of the electric power supply circuit 10 employed in each of the wireless sensor units in the first embodiment, an electric power supply section 20 inclusive of the electric power receiving sections 8A or 8B for receiving an electric driving power transmitted by wireless is employed. Other structural features are substantially similar to those shown and described in connection with the first embodiment.

Each of the electric power supply section 20 serves as a means for supplying an electric power, received by the electric power receiving section 8A or 8B, to the respective sensor section 6A or 6B and the respective sensor signal transmitting section 9A or 9B and includes an accumulating device 27 for storing part of the received electric power, which is left unused, and a charging circuit 21 for charging the accumulating device 27. The accumulating device 27 may be in the form of a capacitor or a secondary battery. Where the capacitor is used for the accumulating device 27, the capacitor should preferably be of a type capable of accumulating a large electric power enough to compensate for instability of the wireless electric power supply. Each of the electric power receiving sections 8A and 8B includes a tuning circuit and a detecting and rectifying circuit where the wireless electric power supply is carried out by the use of electromagnetic waves.

According to the wireless sensor system of the foregoing construction, since the accumulating device 27 are employed for accumulating the electric power received by the electric power receiving sections 8A and 8B, respectively, part of the electric power received by the electric power receiving sections 8A and 8B during normal times, that is, during a stable condition of the wireless electric power supply, can be accumulated in the corresponding accumulating device 27, so that at the time the wireless electric power supply is instable, the electric power stored in the accumulating device 7 can be utilized for driving the sensor sections 6A and 6B and the sensor signal transmitting sections 9A and 9B. For this reason, there is no need to transmit a large electric power on a steady basis from the electric power transmitting section 12 in anticipation of the instability of the wireless electric power supply and, thus, the electric power consumption of the wireless sensor system can be minimized. Also, since the wireless electric power supply and receipt of the wireless sensor signals are carried out from the common sensor signal receiving unit 5 to the plural wireless sensor units 4A and 4B, the wireless sensor system in its entirety can be simplified in structure.

The wireless sensor system according to the above described second embodiment can be equally applied to the bearing assembly shown in and described with reference to FIG. 4 to render it to be a wireless sensor incorporated bearing assembly.

According to this wireless sensor incorporated bearing assembly, not only does incorporation of the sensor sections 6A and 6B render the corresponding bearing assemblies 51 and 52 to be intelligent and wireless transmission of the sensor signals and the electric power renders the wiring system to be simplified, but the provision of the accumulating device 27 such as capacitors or secondary batteries enables the stable electric power supply to be accomplished. For this reason, there is no need to transmit a large electric power in anticipation of the instability of the wireless electric power supply and, thus, the electric power consumption of the wireless sensor system can be minimized.

Also, the wireless sensor system according to the above described second embodiment can also be equally applied to the wheel support bearing assembly shown in and described with reference to FIG. 5 to render it to be a wireless sensor incorporated bearing assembly.

As hereinbefore described, when the wireless sensor system is applied to the wheel support bearing assembly 33, the wheel support bearing assembly 33 can be designed as an intelligent bearing, and the necessity of any harness between the vehicle wheel and the vehicle body structure can be eliminated. The provision of the accumulating device 27 as shown in FIG. 8 makes it possible for the electric power to be supplied reliably to the sensor section 6A and the sensor signal transmitting section 9A to thereby stabilize the control, and further more, the consumption of the wireless supplied electric power can be minimized. In other words, there is no need to transmit a large electric power in anticipation of the instability of the wireless electric power supply and, thus, the electric power consumption of the wireless sensor system can be minimized. This in turn leads to improvement in mileage.

In addition, the wireless sensor system according to the second embodiment can be applied to the wheel support bearing assembly shown in and described with reference to any one of FIGS. 6 and 7 to render it to be a wireless sensor incorporated wheel support bearing assembly.

Other than the various wheel support bearing assemblies, the present invention can also be equally applied to any industrial machinery, machine tools and transport machinery for accomplishing wireless detection of a target of detection in various bearings and/or other sites employed therein.

What is claimed is:

1. A wireless sensor system comprising:
one or a plurality of wireless sensor units including a sensor section to detect a target of detection, a sensor signal transmitting section to wirelessly transmit a sensor signal outputted from the sensor section, and an electric power receiving section to wirelessly receive an electric operating power to drive the sensor section and the sensor signal transmitting section;
a sensor signal receiving section to receive the sensor signal transmitted from the sensor signal transmitting section; and
an electric power transmitting section to wirelessly transmit an electric operating power to the electric power receiving section,
wherein the wireless sensor unit includes a digitalizing section to digitalize the sensor signal outputted from the sensor section and the sensor signal transmitting section transmits the digitalized sensor signal,
wherein the electric power transmitting section is provided in a sensor signal receiving unit having the sensor signal receiving section.

2. The wireless sensor system as claimed in claim 1, wherein the plurality of the wireless sensor units are provided, and
the sensor signal receiving section receives the sensor signal from the sensor section, which is transmitted from each of the wireless sensor units.

3. The wireless sensor system as claimed in claim 1, wherein the wireless sensor unit includes a plurality of sensors forming respective parts of the sensor section.

4. The wireless sensor system as claimed in claim 1, wherein a sensor forming the sensor section is at least one of a revolution sensor, an acceleration sensor, a vibration sensor, a temperature sensor, a load sensor, a torque sensor or a preload sensor for a bearing assembly.

5. The wireless sensor system as claimed in claim 1, wherein one of the sensor sections includes a revolution sensor comprising a pulsar ring and a magnetoresistance magnetic sensor disposed in face-to-face relation with the pulsar ring.

6. The wireless sensor system as claimed in claim 5, wherein the revolution sensor is a means for generating pulses, and
the sensor signal digitalized by the digitalizing section is a signal indicative of the period of the pulses.

7. A wireless sensor system comprising:
one or a plurality of wireless sensor units including a sensor section to detect a target of detection, a sensor signal transmitting section to wirelessly transmit a sensor signal outputted from the sensor section, and an electric power receiving section to wirelessly receive an electric operating power to drive the sensor section and the sensor signal transmitting section;
a sensor signal receiving section to receive the sensor signal transmitted from the sensor signal transmitting section; and
an electric power transmitting section to wirelessly transmit an electric operating power to the electric power receiving section,
wherein the wireless sensor unit includes a digitalizing section to digitalize the sensor signal outputted from the sensor section and the sensor signal transmitting section transmits the digitalized sensor signal,
one of the sensor sections includes a revolution sensor comprising a pulsar ring and a magnetoresistance magnetic sensor disposed in face-to-face relation with the pulsar ring,
the revolution sensor is a means for generating two or more pulses of different phases, and
the sensor signal digitalized by the digitalizing section is a signal indicative of the period of the pulses and a direction of revolution.

8. The wireless sensor system as claimed in claim 2, wherein each of the wireless sensor units is designed to allow the sensor signal transmitting section to transmit, in addition to the sensor signal, an identifying signal indicative of the individual wireless sensor unit.

9. The wireless sensor system as claimed in claim 3, wherein the wireless sensor unit is designed to transmit, in addition to the sensor signal, an identifying number indicative of the individual sensor forming a part of the sensor section.

10. The wireless sensor system as claimed in claim 1, wherein the sensor signal transmitting section transmits the sensor signal by means of a spread spectrum communication scheme.

11. A wireless sensor system incorporated bearing assembly comprising a wireless sensor unit employed in the wireless sensor system as defined in claim 1, the wireless sensor unit being mounted on a bearing assembly.

12. The wireless sensor system incorporated bearing assembly as claimed in claim 11, wherein one of sensors forming respective part of the sensor section is a preload sensor for the bearing assembly.

13. The wireless sensor incorporated bearing assembly as claimed in claim 11, wherein the bearing assembly includes an outer member having a plurality of raceways, an inner member having raceways aligned with the raceway in the outer member, and a plurality of rows of rolling elements interposed between the raceways in the outer member and the raceways in the inner member, respectively, which assembly is a wheel support bearing assembly to rotatably support a vehicle wheel relative to a vehicle body structure.

14. A wireless sensor system comprising:
one or a plurality of wireless sensor units including a sensor section to detect a target of detection, a sensor signal transmitting section to wirelessly transmit a sensor signal outputted from the sensor section, and an electric power receiving section to wirelessly receive an electric operating power to drive the sensor section and the sensor signal transmitting section;
a sensor signal receiving section to receive the sensor signal transmitted from the sensor signal transmitting section; and
an electric power transmitting section to wirelessly transmit an electric operating power to the electric power receiving section,
wherein the wireless sensor unit comprises an electric power accumulating device or a secondary battery to accumulate the electric power received by the electric power receiving section, and
the electric power transmitting section is provided in a sensor signal receiving unit having the sensor signal receiving section.

15. A wireless sensor incorporated bearing assembly including a rolling bearing assembly comprising:
an inner member;
an outer member
a plurality of rolling elements interposed between the inner member and the outer member;
a wireless sensor system including one or a plurality of wireless sensor units including a sensor section to detect a target of detection, a sensor signal transmitting section to wirelessly transmit a sensor signal outputted from the sensor section, and an electric power receiving section to wirelessly receive an electric operating power to drive the sensor section and the sensor signal transmitting section, a sensor signal receiving section to receive the sensor signal transmitted from the sensor signal transmitting section, and an electric power transmitting section to wirelessly transmit an electric operating power to the electric power receiving section, wherein the wireless sensor unit comprises an electric power accumulating device or a secondary battery to accumulate the electric power received by the electric power receiving section; and
an electric power accumulating device or a secondary battery to accumulate the electric power received by the electric power receiving section.

16. The wireless sensor incorporated bearing assembly as claimed in claim 15, wherein the sensor is operable to detect, as a target of detection, one of revolution of the rolling bearing assembly, temperature, acceleration, load, torque or bearing preload.

17. The wireless sensor incorporated bearing assembly as claimed in claim 15, wherein the rolling bearing assembly comprises an outer member having a plurality of raceways, an inner member having raceways aligned with the raceways referred to above, respectively, and a plurality of rolling elements interposed between the raceways in the outer member and the raceways in the inner member, respectively, the rolling bearing assembly being a wheel support bearing assembly to rotatably support a vehicle wheel relative to a vehicle body structure.

* * * * *

UNITED STATES PATENT AND TRADEMARK OFFICE
CERTIFICATE OF CORRECTION

| | | |
|---|---|---|
| PATENT NO. | : 7,612,665 B2 | Page 1 of 1 |
| APPLICATION NO. | : 10/572308 | |
| DATED | : November 3, 2009 | |
| INVENTOR(S) | : Koichi Okada et al. | |

It is certified that error appears in the above-identified patent and that said Letters Patent is hereby corrected as shown below:

Column 18, Line 29, change "member" to --member;--.

Signed and Sealed this

Nineteenth Day of January, 2010

David J. Kappos
*Director of the United States Patent and Trademark Office*